United States Patent
Kaiser

(10) Patent No.: US 10,113,241 B2
(45) Date of Patent: Oct. 30, 2018

(54) CONTROL BOARD FOR CONTROLLING CHANNEL SEQUENCING OF POSITIVE AND NEGATIVE DC VOLTAGE AND CURRENT

(71) Applicant: Jeffrey Allen Kaiser, Cedar City, UT (US)

(72) Inventor: Jeffrey Allen Kaiser, Cedar City, UT (US)

( * ) Notice: Subject to any disclaimer, the term of this patent is extended or adjusted under 35 U.S.C. 154(b) by 158 days.

(21) Appl. No.: 14/614,404

(22) Filed: Feb. 4, 2015

(65) Prior Publication Data

US 2015/0222116 A1    Aug. 6, 2015

Related U.S. Application Data

(60) Provisional application No. 61/935,759, filed on Feb. 4, 2014.

(51) Int. Cl.
*H02M 3/28* (2006.01)
*C25B 1/06* (2006.01)
*C25B 15/02* (2006.01)

(52) U.S. Cl.
CPC ............... *C25B 1/06* (2013.01); *C25B 15/02* (2013.01); *H02M 3/285* (2013.01); *Y02E 60/366* (2013.01)

(58) Field of Classification Search
CPC ................ H02M 3/285; C25B 15/02
See application file for complete search history.

(56) References Cited

U.S. PATENT DOCUMENTS

| | | | | |
|---|---|---|---|---|
| 5,545,310 A | * | 8/1996 | Silveri | C02F 1/46104 205/537 |
| 5,966,562 A | * | 10/1999 | Maehara | G05D 23/1913 219/494 |
| 2003/0112647 A1 | * | 6/2003 | Liu | H02J 1/102 363/144 |
| 2004/0004005 A1 | * | 1/2004 | Sheldon | C25B 1/04 205/630 |
| 2004/0160216 A1 | * | 8/2004 | Speranza | H02M 3/285 320/140 |
| 2005/0164286 A1 | * | 7/2005 | O'uchi | C12Q 1/68 435/6.11 |

(Continued)

OTHER PUBLICATIONS

Washer Generator https://www.youtube.com/watch?v=d74jg-SwEDc downloaded Mar. 28, 2017.

(Continued)

*Primary Examiner* — Matthew D Krcha
(74) *Attorney, Agent, or Firm* — Loza & Loza, LLP; Heidi Eisenhut

(57) ABSTRACT

A controller board for controlling sequencing of positive and negative DC voltage and current to one or more devices or groups of device to achieve an optimum output from the one or more device or groups of devices using the least amount of energy is provided. The sequencing of signals may be programmed into or uploaded into the controller board for providing the order in which power is provided to the one or more devices or groups of devices. A sequence may be a set of paired outputs (one (+) and one (−)) turned On in the order they have been programmed/entered and at a selected frequency. According to one embodiment, there can be up to 8 steps (1 to 8) in a sequence.

6 Claims, 5 Drawing Sheets

(56) References Cited

U.S. PATENT DOCUMENTS

| | | | | |
|---|---|---|---|---|
| 2007/0251829 A1* | 11/2007 | Marsh | ............... | H01M 8/0289 |
| | | | | 205/343 |
| 2007/0272546 A1* | 11/2007 | Matthews | ............... | C25B 15/02 |
| | | | | 204/230.2 |
| 2009/0229992 A1* | 9/2009 | Sanchez | ............... | C02F 1/4674 |
| | | | | 205/687 |
| 2010/0276279 A1* | 11/2010 | Arnett | ............... | C25B 1/06 |
| | | | | 204/274 |
| 2014/0266074 A1* | 9/2014 | Herber | ............... | H02J 7/007 |
| | | | | 320/166 |

OTHER PUBLICATIONS

HHO 240AC, Rectified Big Hydrogen https://www.youtube.com/watch?v=oQ9GvEZcKzg downloaded Mar. 28, 2017.

17 Plate HHO Generator https://www.youtube.com/watch?v=HZkeRCWB5Qk downloaded Mar. 28, 2017.

Stan Meyers More Vacuum Effects https://www.youtube.com/watch?v=tlF1x5S2QXA downloaded Mar. 28, 2017.

Hydrogen Generator Mini Design https://www.youtube.com/watch?v=JdA3GgE4BQ8 downloaded Mar. 28, 2017.

The Greatest Hydrogen Generator Available https://www.youtube.com/watch?v=eXxN_nh84Pg downloaded Mar. 28, 2017.

HHO Swiss INOX 7 Powerful Mini Dual Coil + Marine Wire Coil https://www.youtube.com/watch?v=11Qn4CGIZp4&t=2s downloaded Mar. 28, 2017.

HHO Swiss INOX 6 Supercell Variable Size https://www.youtube.com/watch?v=fF-zdHZGkR8 downloaded Mar. 28, 2017.

20—Hydrogen HHO Electrolyzer Test Unit https://www.youtube.com/watch?v=ePn2wSIAt4o&index=9&list=PL8AF1E443F277F377 downloaded Mar. 28, 2017.

Super Cell 100% Performance https://www.youtube.com/watch?v=A7S5KAEqzmo downloaded Mar. 28, 2017.

HHO Flashback Relief Valve https://www.youtube.com/watch?v=hBJIZq2GQRM downloaded Mar. 28, 2017.

59 Plate Cell.. Flash Arrester (Hydrogen HHO Flashback Killers Test) https://www.youtube.com/watch?v=_2Td-h8UUVw&list=PL0FB7BD6FEAAD6093 downloaded Mar. 28, 2017.

\* cited by examiner

CONTROL BOARD FOR CONTROLLING CHANNEL SEQUENCING OF POSITIVE AND NEGATIVE DC VOLTAGE AND CURRENT

CLAIM OF PRIORITY UNDER 35 U.S.C. § 119

The present application for patent claims priority to U.S. Provisional Application No. 61/935,759 entitled "CONTROL BOARD FOR CONTROLLING CHANNEL SEQUENCING", filed Feb. 4, 2014, assigned to the assignee hereof and hereby expressly incorporated by reference herein.

FIELD OF INVENTION

The present invention relates to a controller board for controlling sequencing of positive and negative DC voltage and current to one or more devices or groups of devices to achieve an optimum output from the one or more devices or groups of devices using the least amount of energy.

BACKGROUND OF INVENTION

A controller board is a printed circuit board that provides all the circuitry necessary for a useful control task. Typically, a programmable controller board has a main processor that is connected through one or more output interface modules to outputs devices that control a machine or process.

Existing controller boards fail to provide for the sequencing of signals to be programmed into or uploaded into the controller board for controlling (i.e. providing power to) stainless steel plates, where the sequencing of signals is a set of paired outputs (one positive (+) and one negative (−)) that are turned On in a pre-determined order and at a selected frequency.

Accordingly, a controller board that allows for the programming and running of the sequencing of signals to one or more devices or groups of devices, such as stainless steel plates, to achieve an optimum output from the one or more devices or groups of devices using the least amount of energy is needed.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one embodiment, a controller board for controlling sequencing of positive and negative DC voltage and current to one or more devices or groups of devices is provided. The controller board includes a processing circuit; a memory device, coupled to the processing circuit, for storing one or more sequences, the one or more sequences defining the order in which power is delivered to the one or more devices or groups of devices; a first plurality of two position terminal blocks connected to pairs of positive drive outputs for providing a power connection to the one or more devices or groups of devices; and a second plurality of two position terminal blocks connected to pairs of negative drive outputs for providing a ground connection to the one or more devices or groups of devices.

In one aspect, one positive drive and one negative drive are activated at one time. Each of the positive drive outputs is a p-type MOSFET and each of the negative drive outputs is a n-type MOSFET.

In another aspect, the controller board further comprises a manual run/program switch assembly, in communication with the processing circuit, operable between a run position and a program position, wherein the run position causes the controller board to follow a pre-programmed sequence and wherein the program position allows for the programming of a new sequence.

In yet another aspect, the controller boards comprises a display, connected to the processing circuit, for displaying the current sequence.

In yet another aspect, the one or more devices or groups of devices are stainless steel plates.

In yet another aspect, the stainless steel plates are placed in water and delivering power to the stainless steel plates releases a hydrogen gas.

In yet another aspect, the controller board further comprises a first plurality of visual indicators, such as LEDs, connected to the negative drive outputs for identifying which negative output channels is currently activated.

In yet another aspect, the controller board further comprises a second plurality of visual indicators, such as LEDS, connected to the positive drive outputs for identifying which positive output channel is currently activated.

In yet another aspect, the controller board further comprises a first electric switch, such as a dip switch, in communication with the processing circuit for programming which of the positive drive outputs to turn On at each step in the sequence.

In yet another aspect, the controller board further comprises a second electric switch, such as a dip switch, in communication with the processing circuit for programming which of the negative drive outputs to turn On at each step in the sequence.

In yet another aspect, the controller board further comprises polarity of the one or more devices or groups of devices is reversed to clean off deposits on the one or more devices or groups of devices.

According to another embodiment, a controller board for controlling sequencing of positive and negative DC voltage and current to one or more devices or groups of devices is provided. The controller board includes a processing circuit; a memory device, coupled to the processing circuit, for storing one or more sequences, the one or more sequences defining the order in which power is delivered to the one or more devices or groups of devices; a first plurality of two position terminal blocks connected to pairs of positive drive outputs for providing a power connection to the one or more devices or groups of devices; a second plurality of two position terminal blocks connected to pairs of negative drive outputs for providing a ground connection to the one or more devices or groups of devices; and a manual run/program switch assembly, in communication with the processing circuit, operable between a run position and a program position, wherein the run position causes the controller board to follow a pre-programmed sequence and wherein the program position allows for the programming of a new sequence.

In one aspect, each of the positive drive outputs is a p-type MOSFET; and wherein each of the negative drive outputs is a n-type MOSFET.

In one aspect, the controller board further comprises a first plurality of visual indicators connected to the negative drive outputs for identifying which negative output channels is currently activated; and a second plurality of visual indicators connected to the positive drive outputs for identifying which positive output channel is currently activated.

In another aspect, the controller board further comprises, a first electric switch in communication with the processing circuit for programming which of the positive drive outputs to turn On at each step in the sequence; and a second electric switch in communication with the processing circuit for programming which of the negative drive outputs to turn On at each step in the sequence.

In yet another aspect, the one or more devices or groups of devices are stainless steel plates; and wherein the stainless steel plates are placed in water and delivering power to the stainless steel plates releases a hydrogen gas.

DETAILED DESCRIPTION

Figure 1:
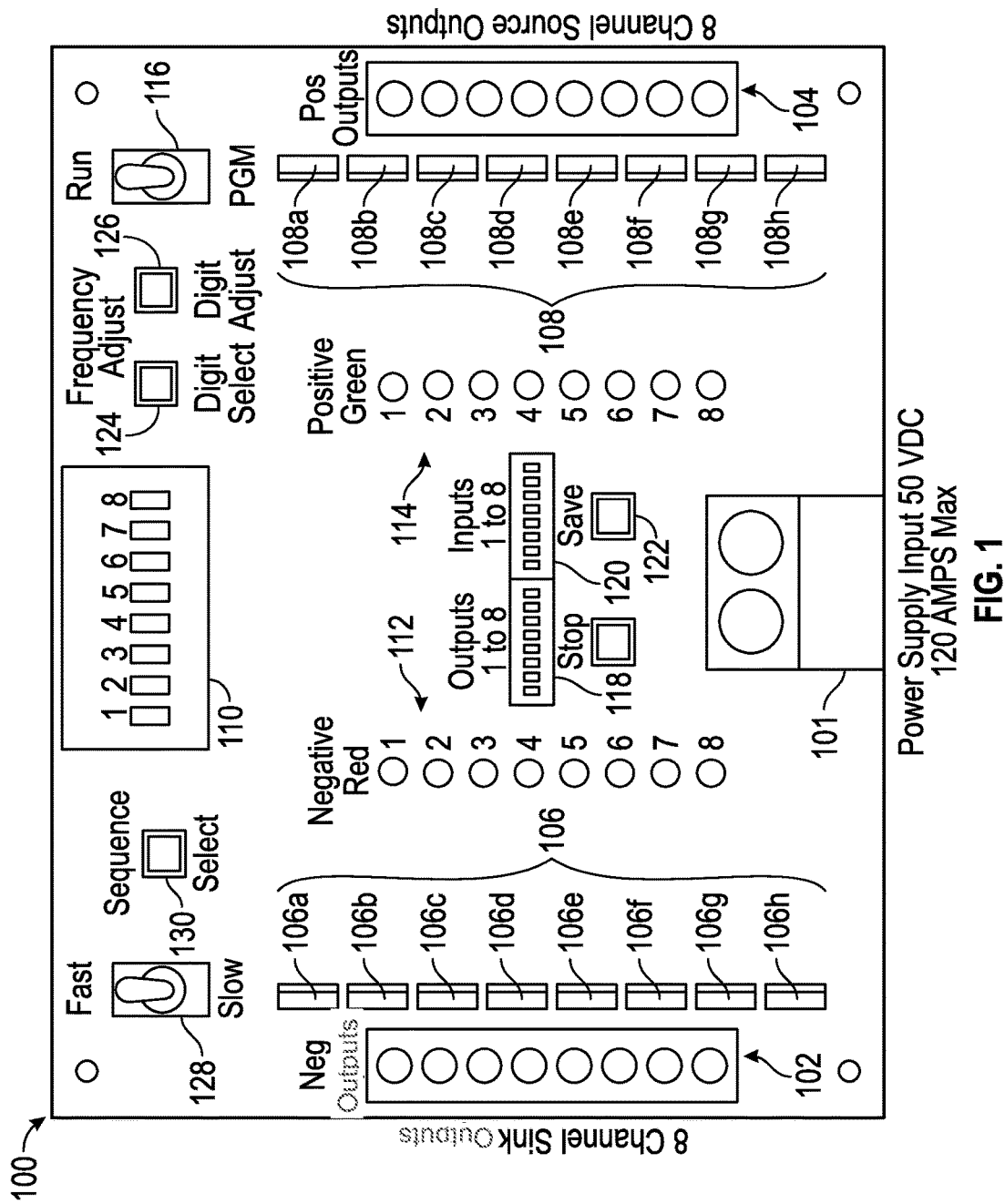
FIG. 1 illustrates a layout of a controller board for controlling the sequencing of signals to one or more devices or groups of devices, according to one embodiment.

In the following detailed description, numerous specific details are set forth in order to provide a thorough understanding of the embodiments. However, it will be understood by one of ordinary skill in the art that the embodiments may be practiced without these specific details. For example, operations may be shown in block diagrams, or not be shown at all, in order not to obscure the embodiments in unnecessary detail. In other instances, well-known operations, structures and techniques may not be shown in detail in order not to obscure the embodiments.
Overview A controller board for controlling sequencing of positive and negative DC voltage and current to one or more devices or groups of devices to achieve an optimum output from the one or more device or groups of devices using the least amount of energy is provided. The sequencing of signals (or sequence) may be programmed into or uploaded into the controller board for providing the order in which power is provided to the one or more devices or groups of devices. The sequencing of signals (or sequence) may be a set of paired outputs (one (+) and one (−)) turned On in the order they have been programmed/entered and at a selected frequency. According to one embodiment, there can be up to 8 steps (1 to 8) in a sequence.

In one example, the devices or groups of devices may be stainless steel plates. The sequencing of signals (or "sequencing" or "sequence") may determine or provide the order in which power is delivered to the pairs of stainless steel plates. That is, the controller board may be connected to a plurality of paired stainless steel plates where each pair comprises a positive plate and a negative plate. The pairs of plates may be electrically connected to the controller board by wires, cables or any other known method or device known in the art. That is, each plate may be connected to the controller board by a wire or cable, for example, that creates an electrical path that is used to convey a direct current (DC) pulse in the form of a bit stream to the plate.

The sequencing of signals may be transmitted to conductive channels via a first and a second group of metal-oxide-semiconductor field-effect transistors (MOSFET). The conductive channel is the "stream" through which electrons flow from the source to the drain of the MOSFETs. The electrical connection, via wires or cables, may include an equal number of outputs (source) channels and output (sinks) channels. The output (source) channels may source 50 volts and the output (sink) channels may sink the current to ground. In one embodiment, the controller board may include 16 channels, eight (8) output (source) channels and eight (8) output (sink) channels. The channels may be activated by receiving the sequencing of signals in the form of pulses. Each channel may source/sink up to 20 amps.

A display may be located on the board for identifying the current sequence number and the frequency of the sequencing of signals being provided to the controller board. According to one example, an eight digit seven segment display may be used where the left most digit is the sequence number and the last six digits is the frequency at which the sequencing of signals is being transmitted. Although a seven segment display is shown, this is by way of example only and any other type of display, such as a liquid crystal display, could be employed.

According to one embodiment, the plates may be located in water and applying the signals across the plates in a specific sequence or order may cause hydrogen gas to be released or emitted. As the plates are located in water, hard water deposits may form on the stainless steel plates. To clean the deposits off the plates, the polarity of the plates may be reversed. In one example, the polarity of the plates may be reversed every two hours or so which in turn will cause the deposits to be removed or blown off the stainless steel plates. According to one embodiment, the positive side may include two rows of MOSFETs, one row having p-type MOSFETs and the other row having n-type MOSFETs because what is positive for the first two hours will be negative for the next two hours.
Layout of a Controller Board FIG. 1 illustrates a layout of a controller board for controlling the sequencing of signals to one or more devices or groups of devices, according to one embodiment. A power supply 101 may be located on the board for supplying a voltage of 50 VDC with a maximum of 120 Amps. Alternatively, the power supply 101 may be separate from the board.

As shown, the controller board 100 may include a plurality of output (sink) channels 102 and a plurality of output (source) channels 104. Although eight (8) output (sink) channels and eight (8) output (source) channels are shown, this is by way of example only and there may be more than eight (8) output (sink) channels and eight (8) output (source) channels or less than eight (8) output (sink) channels and eight (8) output (source) channels. Each channel may be individually controlled and the output (source) channels may source 50 volts and the output (sink) channels may sink the current to ground. The plurality of output (sink) channels 102 may be negative outputs and the plurality of output (source) channels 104 may be positive outputs. According to one example, two (2) negative and two (2) positive channels may be sequenced or activated at a time. The maximum voltage may be 50 VDC, the maximum current may be 20 Amps and the frequency may be between 1 and 150 KHz. According to one embodiment, the temperature in which the controller board 100 operates may be between 0 and 45 Degrees Celsius (0-113 Degrees Fahrenheit) and the humidity may be between 10 to 90% RH, non-condensing.

Figure 2:
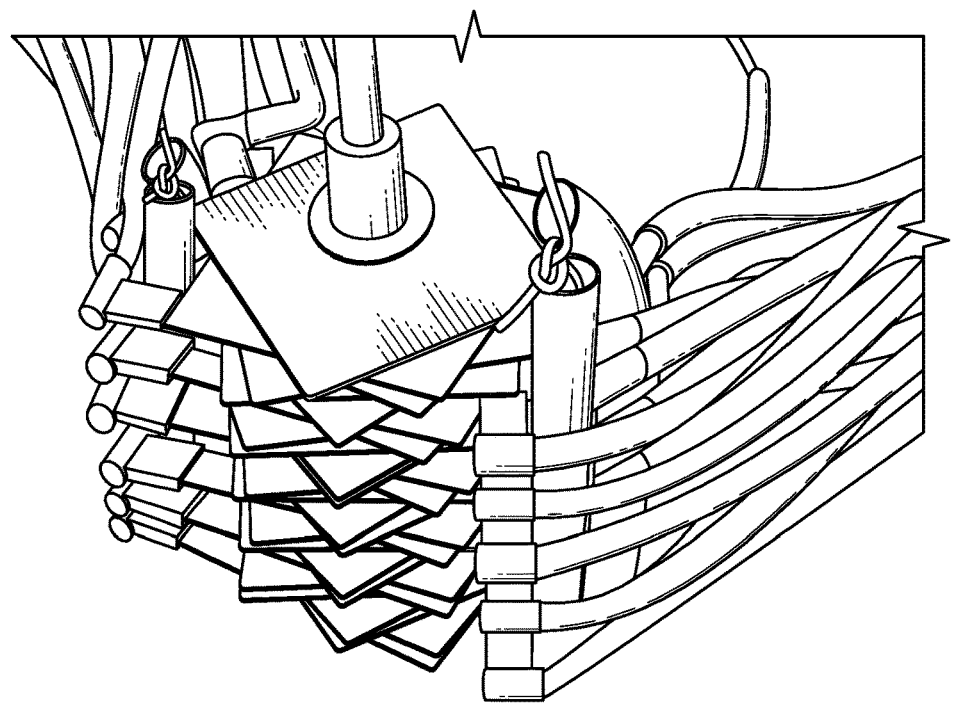
FIG. 2 illustrates a plurality of n-type MOSFETs and a plurality of p-type MOSFETs connected to separate stainless steel plates via a wire or cable, according to one embodiment.
Figure 3:
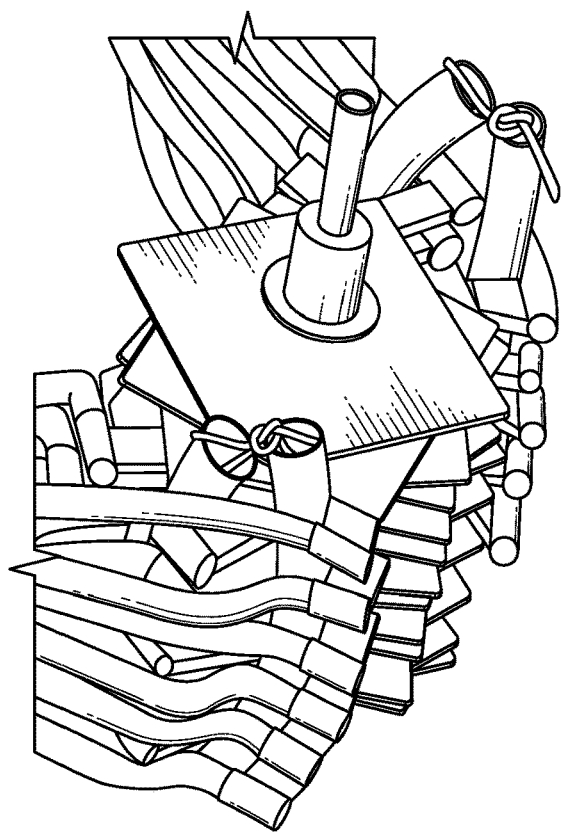
FIG. 3 illustrates a plurality of n-type MOSFETs and a plurality of p-type MOSFETs connected to separate stainless steel plates via a wire or cable, according to one embodiment.

The plurality of output (sink) channels 102 may be connected to a first plurality of switches 106 (106a-106h) and the plurality of output (source) channels 104 may be connected to a second plurality of switches 108 (108a-108h). Each of first plurality of switches 106a-106h may be an n-type MOSFET and each of the second plurality of switches 108a-108h may be a p-type MOSFTET. According to one embodiment, each of the n-type MOSFETs 106a-106h and each of the p-type MOSFETs 108a-108h may be connected to a separate stainless steel plate via a wire or cable. (See FIGS. 2 and 3) The sequencing of signals to the stainless steel plates determines the sequence of activation of the plates, i.e. the sequence in which power is delivered across the plates. According to one embodiment, the plates may be located in water and applying power across the plates in a specific sequence or order causes hydrogen gas to be released or emitted.

A display 110 may be electrically coupled to a processing circuit (not shown) for displaying the current sequence number, sequence step and frequency of the sequence of signals being applied to the plates. As shown, the display 110 may be capable of displaying at least eight (8) digits wherein the first digit identifies the current sequence number, the second digit identifies the current sequence step and the remaining six (6) digits represent the frequency the controller board 100 is operating at. Although the display 110 displays eight (8) digits, this is by way of example only.

A first plurality of visual indicators 112 may be connected to the plurality of output (sink) channels 102 and/or switches 106 to identify which output (sink) channel is currently activated. A second plurality of visual indicators 114 may be connected to the plurality of output (source) channels 104 and/or switches 108 to identify which output channel is currently activated. According to one embodiment, the first and second plurality of visual indicators 112, 114 may be light emitting diodes (LED). The numbering on each LED may correspond to its respective output. In normal operation (full speed) these LEDs may be flashed whenever an output is On, however, the flashing may be too fast to be seen. Although the visual indicators are described as LEDs, other types of visual indicators could be employed, such as incandescent or fluorescent elements, liquid crystal displays, etc. If an LED is used as visual indicators 112, 114, the LED could be a single color or multi-color LED.

Programming/Selecting Sequences

A manual run/program switch 116 located on the controller board may be used when programming channel sequencing for a control board. The manual run/program switch 116 may be operable between a "program" mode or position and a "run" mode or position. According to one embodiment, when the manual run/program switch 116 is set to "program", the user can select one of up to ten (10) sequences (0-9), up to 10 steps (0-9), and any combination of output channels to the On position as long as the ten (10) steps are not exceeded, and a frequency for each sequence. According to another embodiment, the user can select one of up to twenty-five (25) sequences (0-24), up to 25 steps (0-24), and any combination of output channels to the On position as long as the twenty-five (25) steps are not exceeded, and a frequency for each sequence. Although embodiments with ten (10) and twenty-five (25) sequences are described, these are by way of example only and the user can select less than ten (10), more than ten (10) but less than twenty-five (25) sequences or more than twenty-five (25) sequences.

Figure 4:
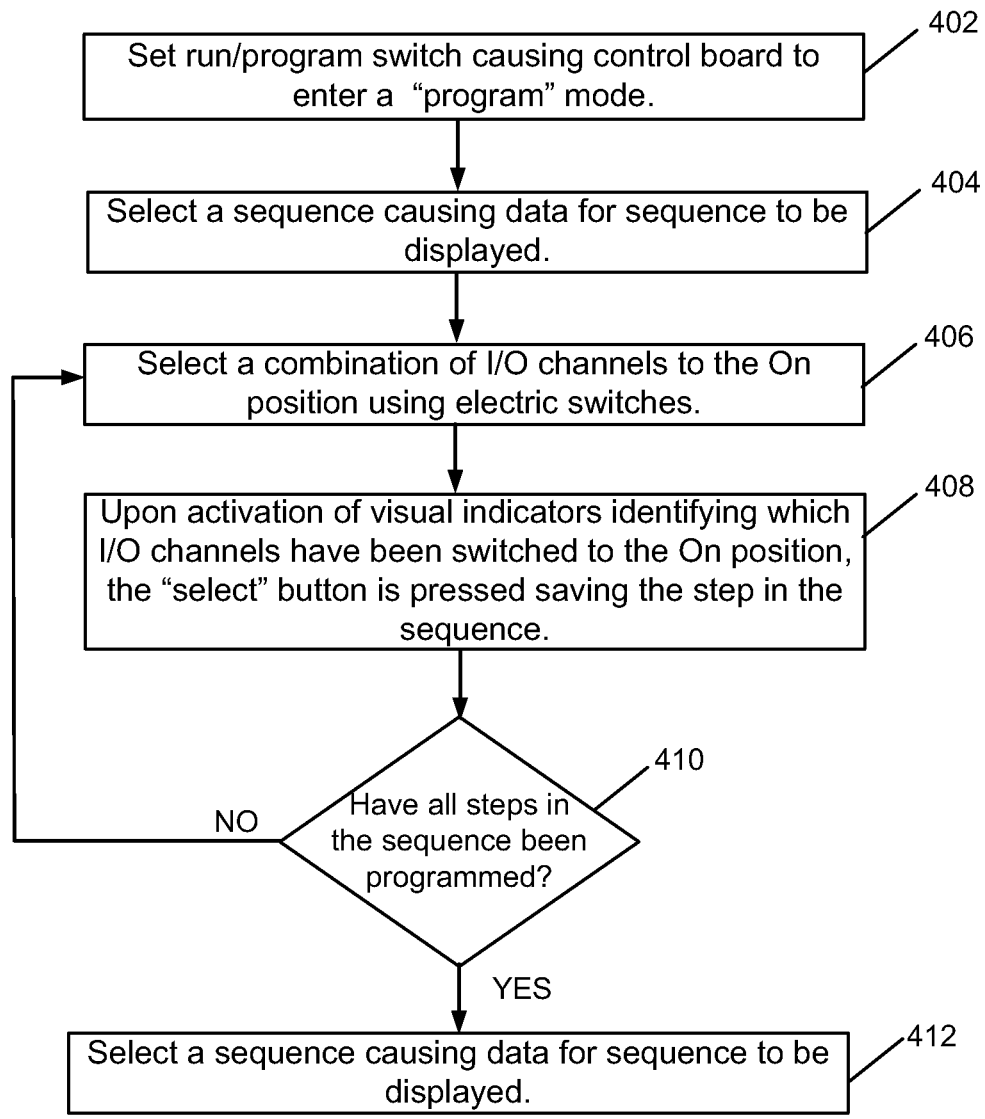
FIG. 4 illustrates a method for programming channel sequencing for a control board, according to one embodiment.

FIG. 4 illustrates a method for programming channel sequencing for a control board, according to one embodiment. First, the manual run/program switch 116 may be toggled/set/switched to the "program" position causing the controller board 100 to enter a "program" mode 402. Once in the "program" mode, a user may select a specific sequence, for example one of ten (10) sequences, to program or use 404. As each sequence is selected, the data for that sequence is displayed on the display 110. Once a sequence has been selected, a pair of eight (8) position electric switches, such as dip switches, 118, 120 may be used to select the I/O channels for each step in the sequence 406. That is, the electric switches may be utilized/switched/moved to select which MOSFETS that will be turned On and at what time. Although the electric switches are shown as dip switches, this is by way of example only and any other type of electric switch could be employed.

According to one example, the first and second switches on the dip switches 110 may be moved to an On position which in turn will activate the appropriate lights in the visual indicators 112, 114. Upon activation of the lights identifying which I/O channels have been switched to the On position (i.e. the first and second plurality of visual indicators 112, 114 may indicate which I/O channels that are On for each step), the "select" button 130 may be pressed saving the first step in the sequence 408.

Next, a determination may be made as to whether all steps in the sequence have been programmed 410. If all steps in the sequence have not been programmed, the pair of electric switches 118, 120 may again be utilized to select a combination of I/O channels to the On position 406. For example when programming the second step in the sequence, the first and second switches on the dip switch 110 may be moved to the Off position and the third and fourth switches in the dip switch 110 may be moved to an On position which in turn will activate the appropriate lights in the visual indicators 112, 114. Upon activation of the lights identifying which I/O channels have been switched to the On position (i.e. the first and second plurality of visual indicators 112, 114 may indicate which I/O channels that are On for each step), the "select" button 130 may be pressed saving the second step in the sequence 408.

This procedure may be repeated for all steps in the sequence until the entire sequence has been programmed. Once all the steps in the sequence have been programmed, a "save" button 122 may be pressed saving and programming the sequencing (or sequence) into memory 412 (for example see memory 428 in FIG. 4).

Selecting Frequency of Sequences

Figure 5:
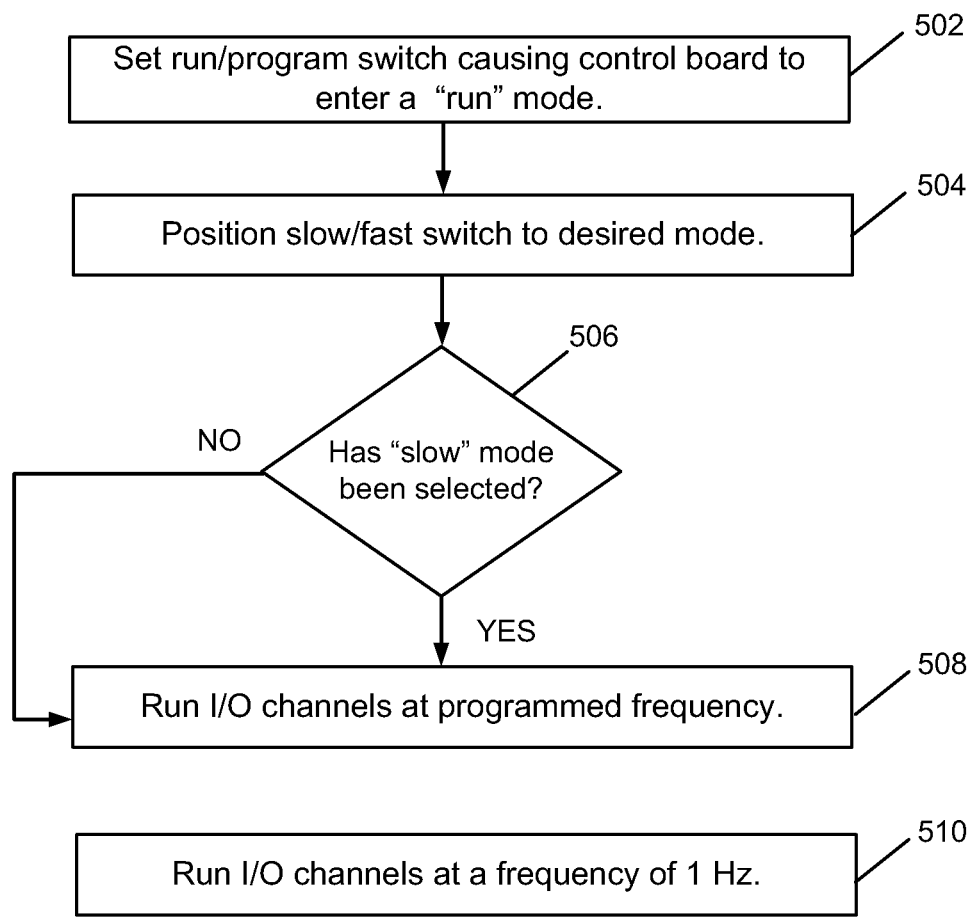
FIG. 5 illustrates a method for selecting the frequency of the sequencing of signals being provided to a controller board, according to one embodiment.

FIG. 5 illustrates a method for selecting the frequency of the sequencing of signals being provided to a controller board, according to one embodiment. To program the frequency, a Digit Select button 124 and a Digit Adjust button 126, electrically coupled to a processing circuit, located on the controller board may be utilized. When in the frequency programming mode, the I/O channels are inactive.

First, the run/program switch 116 may be set to the "run" mode 502. In the "run" mode, there are two options as dictated by a manual slow/fast switch 128, a "fast" mode and a "slow" mode. When the manual slow/fast switch 128 is positioned in the "slow" mode, the I/O channels may run at a frequency of 1 Hz 508. Alternatively, when the manual slow/fast switch 128 is positioned in the "fast" mode, the I/O channels may be run at the programmed frequency. As indicated above, whenever an I/O channel is turned On, the associated visual indicator, or LED, will flash. When operating at low frequencies (e.g. <30 Hz) the flashing of the LEDs may be visible. However, the flashing of the LEDs will be may not be visible at higher frequencies. A sequence select button 130 may be utilized by a user to select the sequence in which power is delivered to the one or more groups of devices or groups of devices, such as stainless steel plates.

Layout of a Controller Board

Figure 6:
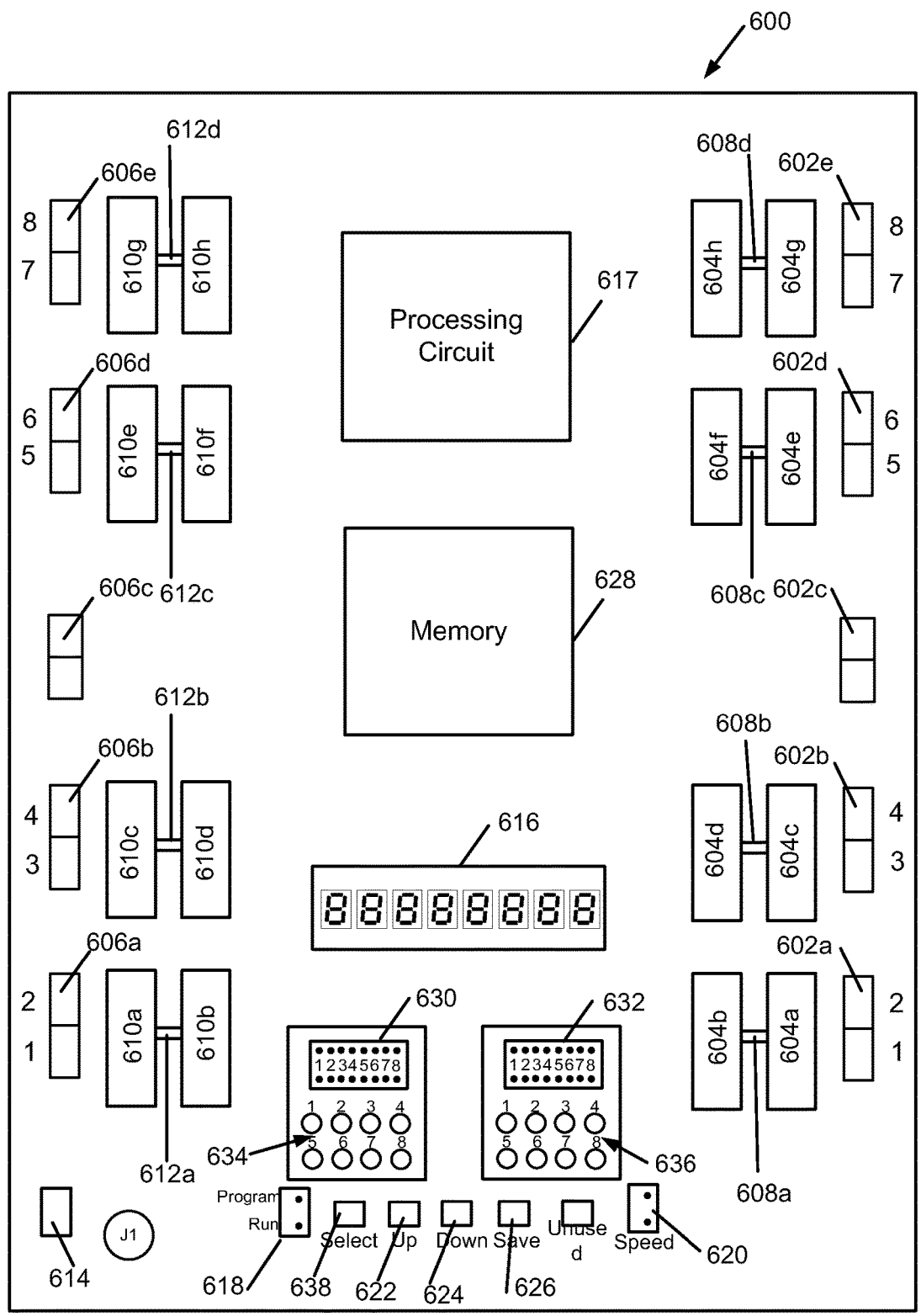
FIG. 6 illustrates a layout of a controller board for controlling the sequencing of signals to one or more devices or groups of devices, according to one embodiment.

FIG. 6 illustrates a layout of a controller board for controlling the sequencing of signals to one or more devices or groups of devices, according to one embodiment. As shown, the controller board 600 may include a first plurality of two position terminal blocks 602a-602e and a second plurality of two position terminal blocks 606a-606e. Terminal block 602c may be provided with a positive 50 VDC power supply connection and terminal block 606c may be provided with a minus 50 VDC (Ground) power supply connection.

Terminal blocks 602a, 602b, 602d and 602e may be connected to positive drive outputs 604a-604h. As shown, two drive outputs may share a heat sink. Positive drive outputs 604a and 604b may share heat sink 608a, positive drive outputs 604c and 604d may share heat sink 608b, positive drive outputs 604e and 604f may share heath sink 608c and positive drive outputs 604g and 604h may share heat sink 608d.

Terminal blocks 606a, 606b, 606c, 606d and 606e may be connected to negative drive outputs 610a-610h. As shown, two drive outputs may share a heat sink. Negative drive outputs 610a and 610b may share heat sink 612a, negative drive outputs 610c and 610d may share heat sink 612b, negative drive outputs 606e and 606f may share heath sink 612c and negative drive outputs 606g and 606h may share heat sink 612d.

According to one embodiment, one positive and one negative drive may be activated, or turned On, at one time. Each of the terminal blocks may be capable of up to 20 Amps.

A jack (J1) may be included on the controller board for accepting a 9 VDC power supply for supplying power to the logic devices on the controller boards. A power switch 614 may also be located on the board for turning On and Off the 9 VDC power supply.

A display 616 may be electrically coupled to processing circuit 617 for displaying the current sequence number, sequence step and frequency. As shown, the display 616 may be capable of displaying at least eight (8) digits wherein the first digit identifies the current sequence number, the second digit identifies the current sequence step and the remaining six (6) digits represent the frequency the controller board 600 is operating at.

A manual run/program switch (such as a toggle switch) 618, electrically connected to the processing circuit 617, may be located on the controller board 600 for switching between a "run" mode and a "program" mode. When the manual run/program switch 618 is set to the "run" mode, there are two options as dictated by a manual slow/normal switch (such as a toggle switch) 620, a "slow" mode and a "fast" mode. The manual slow/normal switch 620 may be electrically connected to the processing circuit 617. When the manual slow/normal switch 620 is positioned in the "slow" mode, a 1 second cycle rate may be used to check pre-programmed sequences. When the manual slow/normal switch 620 is positioned in the "normal" mode, the sequence may be run at the frequency selected.

When the manual run/program switch 618 is set to the "program" mode, the display 616 may display the current selected frequency followed by an "F". An Up bottom 622 and a Down button 624, electrically connected to the processing circuit 617, may be used to select a frequency for which to run the sequences. Once the frequency has been selected, a Save button 626 may be pressed saving the frequency in non-volatile memory 628. Next time the 9 VDC power supply is turned On or supplied to the controller board 600, the last programmed frequency may be displayed.

A pair of eight (8) position dipswitches 630, 632 (or any other type of electrical switch known in the art) may be used to select the I/O channels for each step in the sequence. One dipswitch 630 may be for "Negative Output Setup Select" and one dipswitch 632 may be for "Positive Output Setup Select". Each dipswitch 630, 632 may be numbered 1 to 8 corresponding to the appropriate output as shown on the perimeter of the controller board 600. After each step in the "program" mode has been completed, the Save button 626 may be pressed saving the program in the memory 628.

A first plurality of visual indicators 634 may be connected to the negative drive outputs and identify which negative output channel is currently activated. A second plurality of visual indicators 636 may be connected to the positive drive outputs and identify which positive output channel is currently activated. The first and second plurality of visual indicators 634, 636 may be light emitting diodes (LED). The numbering on each LED may correspond to its respective output. In normal operation (full speed) these LEDs may be flashed whenever an output is On, however, the flashing may be too fast to be seen.

As described above, a sequence is a set of paired outputs (one + and one −) turned on in the order they are entered at the frequency selected. According to one embodiment, there can be up to 8 steps (1 to 8) in a sequence. According to another embodiment, there can be up to 25 steps (1 to 25) in a sequence. Although embodiments with eight (8) and twenty-five (25) steps are described, these are by way of example only and there may be less than eight (8), more than eight (8) but less than twenty-five (25) steps or and more than twenty-five (25) steps. To program a sequence, a Select button 638 may be pressed and the number 1 will appear on the display. Along with this the previously programmed outputs will be displayed using the 16 LEDs. To change this step, the appropriate dipswitch positions (1 of each only) may be set and then the Save button 626 may be selected saving the change in memory 628. The outputs selected may then be displayed. If these are incorrect, the correct dipswitch locations may be set and then press the Save button 626 may be pressed again saving the change in memory 628. To set the next step in the sequence, the Up or Down buttons 622, 624 may be used and the same procedure described above may be followed.

To power up the controller board 600, the manual run/program switch 618 may be switched to "program" and the logic power switch 614 set to Off. 9 VDC may then be plugged into jack J1 and the 50 VDC power supply may be attached to terminal block 602c and terminal block 604c.

Next positive and negative drives may be attached to the controller board. The 9 VDC power supply may be plugged into a 120 VAC outlet and the logic power switch 614 set to On. Finally, the 50 VDC power supply may be turned on.

To power down the controller board 600, the manual run/program switch 618 may be switched to "program", the 50 VDC power supply turned off and the logic power switch 614 set to Off.

One or more of the components, steps, features and/or functions illustrated in the FIGS. may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described in the FIGS. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

While certain exemplary embodiments have been described and shown in the accompanying drawings, it is to be understood that such embodiments are merely illustrative of and not restrictive on the broad invention, and that this invention is not to be limited to the specific constructions and arrangements shown and described, since various other modifications may occur to those ordinarily skilled in the art.

What is claimed is:

1. A system for controlling sequencing of positive and negative DC voltage and current to release hydrogen gas from water consisting of:
   a power cable for delivery of power;
   one or more stainless steel plate or groups of stainless steel plates consisting of a center hole, to accommodate the power cable for delivery power to the stainless steel plate, surrounded by a continuous flat surface where the flat surface has four equal straight sides forming a square;

a controller board consisting of:
  a processing circuit;
  a memory device coupled to the processing circuit, the memory device programmed by the processing circuit to deliver one or more sequences to the one or more stainless steel plates or groups of stainless steel plates, the one or more sequences defining the order in which power is delivered to the one or more devices or groups of devices;
  a first plurality of two position terminal blocks connected to pairs of positive drive outputs of a first group of transistors for providing a power connection to the one or more devices or groups of devices;
  a second plurality of two position terminal blocks connected to pairs of negative drive outputs of a second group of transistors for providing a ground connection to the one or more devices or groups of devices;
  a manual run/program switch assembly, in communication with the processing circuit, operable between a run position and a program position, wherein the run position causes the controller board to follow a pre-programmed sequence and wherein the program position allows for the programming of a new sequence;
  a display, connected to the processing circuit, for displaying the current sequence;
  a first plurality of visual indicators connected to the negative drive outputs for identifying which negative output channels is currently activated;
  a second plurality of visual indicators connected to the positive drive outputs for identifying which positive output channel is currently activated;
  a first plurality of electric dip switches in communication with the processing circuit for programming which of the positive drive outputs to turn On at each step in the sequence, the number of the first plurality of electric dip switches corresponds to the total number of positive drive outputs;
  a second plurality electric dip switches in communication with the processing circuit for programming which of the negative drive outputs to turn On at each step in the sequence, the number of the second plurality of electric switches corresponds to the total number of negative drive outputs;
  a save button, an up button, a down button and a select button in communication with the processing circuit for programming and saving and the sequences of the positive drive outputs and the negative drive outputs as defined by the first plurality of electronic dip switches and the second plurality of electronic dip switches; and
  wherein the one or more stainless steel plates or groups of stainless steel plates are submerged in the water.

2. The controller board of claim 1, wherein one positive drive in the first group of transistors and one negative drive in the second group of transistors are activated at one time.

3. The controller board of claim 1, wherein each transistor in the first group of transistors is a p-type MOSFET.

4. The controller board of claim 1, wherein each transistor in the second group of transistors is a n-type MOSFET.

5. The controller board of claim 1, wherein the first and second plurality of visual indicators are LEDs.

6. The controller board of claim 1, wherein the processing circuit is programmed for reversing polarity of the one or more devices or groups of devices for cleaning off deposits on the one or more devices or groups of devices.

* * * * *